United States Patent [19]
Watson et al.

[11] Patent Number: 5,347,881
[45] Date of Patent: Sep. 20, 1994

[54] DAMPER ASSEMBLY FOR SHIFT LEVER MECHANISM

[75] Inventors: Rick D. Watson, Lambertville, Mich.; Terry L. Jester, Perrysburg; Ernest F. Deutschman, Toledo, both of Ohio

[73] Assignee: Dana Corporation, Toledo, Ohio

[21] Appl. No.: 762,709

[22] Filed: Sep. 19, 1991

[51] Int. Cl.$^5$ .................. B60K 20/00; G05G 1/04; B25G 3/00
[52] U.S. Cl. .................. 74/473 R; 74/523; 403/281; 403/305
[58] Field of Search .............. 74/473 R, 519, 523, 74/524, 543, 548; 403/274, 278, 281, 300, 305; 464/87, 88, 157

[56] References Cited

U.S. PATENT DOCUMENTS

| | | | |
|---|---|---|---|
| 462,822 | 10/1891 | Marsters | 403/305 X |
| 777,215 | 12/1904 | Meston | 403/305 X |
| 1,883,203 | 10/1932 | Waitehouse | 464/88 |
| 1,927,646 | 1/1933 | Miller | 74/473 P |
| 2,297,619 | 9/1942 | Haberstump | 464/88 |
| 3,134,611 | 5/1964 | Iversen | 285/54 |
| 3,686,747 | 8/1972 | Bagnulo | 29/508 |
| 3,889,354 | 6/1975 | Nishi et al. | 29/516 |
| 3,998,110 | 12/1976 | O'Brien et al. | 74/476 |
| 4,492,129 | 1/1985 | Hasegawa | 74/473 R |
| 4,603,598 | 8/1986 | Tsuji et al. | 74/523 X |
| 4,768,393 | 9/1988 | Beaman | 74/523 X |
| 4,960,009 | 10/1990 | Schultz et al. | 403/305 X |

Primary Examiner—Leslie A. Braun
Assistant Examiner—David W. Laub
Attorney, Agent, or Firm—F. B. McDonald

[57] ABSTRACT

A compound shift lever mechanism employs a noise and vibration damper assembly for isolating an upper shift lever from a lower shift lever of a transmission. In a preferred form, the levers are held in spaced, coaxial alignment for unitary movement in a plurality of planes by a damper which comprises two parts. The first part is a cylindrical elastomeric sleeve defining axially spaced female end portions comprising bores which frictionally overlie and snugly encase the two lever end portions which extend thereinto. The second part is a cylindrical metallic shell which circumferentially encapsulates the elastomeric sleeve which contains the respective ends of the upper and lower levers. The shell thus radially encapsulates both of the end portions, as well as the sleeve, which incorporates a midportion containing a radial internal barrier to prevent direct physical contact between the extremities of the levers. Finally, spaced female ends of the shell are crimped radially inwardly against the female end portions of the sleeve and, in turn, against both lever end portions, to frictionally retain the end portions in spaced, coaxial alignment.

10 Claims, 1 Drawing Sheet

DAMPER ASSEMBLY FOR SHIFT LEVER MECHANISM

BACKGROUND OF THE INVENTION

This invention relates to mechanisms for coupling compound shift levers together for use in transmissions. More particularly, this invention relates to damper assemblies adapted to absorb, and hence to isolate, noise and vibrations which emanate from the transmission of a vehicle.

Numerous damper assemblies for absorbing noise and vibrations have been designed for compound shift lever assemblies, particularly for use in heavy trucks. It is well known to provide rubber or elastomeric materials in joints or connections between upper and lower levers of compound shift levers. A great number of such damper assemblies, however, employ such elastomeric materials between selective portions of relatively complex apparatus. For example, in one compound shift lever device a metallic female extension is attached to a lower portion of an upper male lever to co-axially fix the upper lever to a lower male lever. The metallic extension is threaded, and contains a bore lined with elastomer into which a lower extremity of the upper portion extends. Enshrouded about the coupled levers is an elastomeric boot to enhance vibration absorption capability. Such conventional devices are typical; yet they have been unsatisfactory for lack of simplicity. As a result, such damper systems are often prone to early failures; perhaps such failures have often been statistically introduced into their manufacture via mere complexity.

It would be desireable to provide a shift lever assembly with a vibration and noise damper to isolate noise from the cabin of a truck or other vehicle without the use of complex parts. It would be particularly desirable to completely isolate upper and lower shift levers from vibrations and noise inherent in metal to metal contact via employment of a simple two-piece damper assembly.

SUMMARY OF THE INVENTION

The invention disclosed herein provides a simple two-part damper assembly for isolating noise and vibration from a lower to an upper shift lever of compound shift lever mechanism. The shift mechanism includes a pair of co-axially aligned shift levers axially spaced in a male-to-male relationship with each other. The levers are fixed together along a longitudinal axis by a noise and vibration damper assembly, which holds the levers in fixed position for unitary movement in a plurality of planes. The first of the two-part damper assembly is a cylindrical elastomeric sleeve, which circumferentially encapsulates each of the male end portions of the levers. The sleeve thus radially overlies and surrounds each of the male end portions of the levers, the sleeve having axially spaced female end portions defining axially opposed bores which terminate in a midportion therebetween. The second part of the damper assembly is a separate cylindrical metallic shell which makes no physical contact with the levers. The shell engages and circumferentially encapsulates the sleeve, the shell having a midportion axially coincident with the midportion of the sleeve. The midportion of the sleeve comprises a radially extending elastomeric barrier adapted to prevent physical contact between the extremities of the male end portions. In the preferred form, female end portions of the shell, although radially spaced from any contact with the levers, are radially inwardly crimped against the sleeve to frictionally retain the male end portions in a fixed co-axial relationship.

DETAILED DESCRIPTION OF A PREFERRED EMBODIMENT

Figure 1:
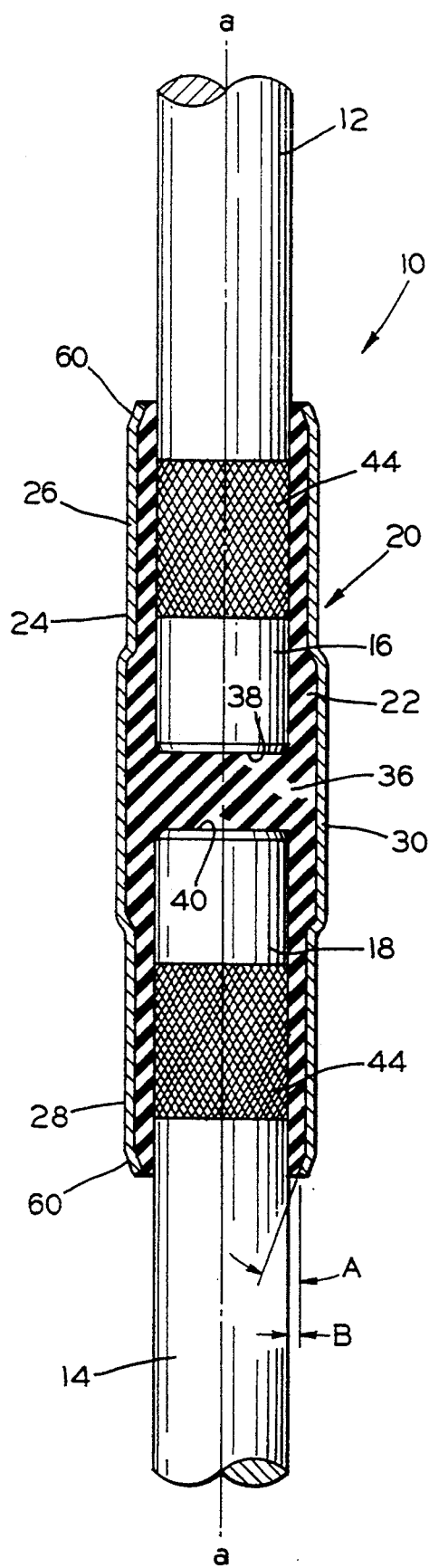
FIG. 1 is a cross sectional view of a compound shift lever mechanism which incorporates the damper assembly of the present invention.
Figure 2:
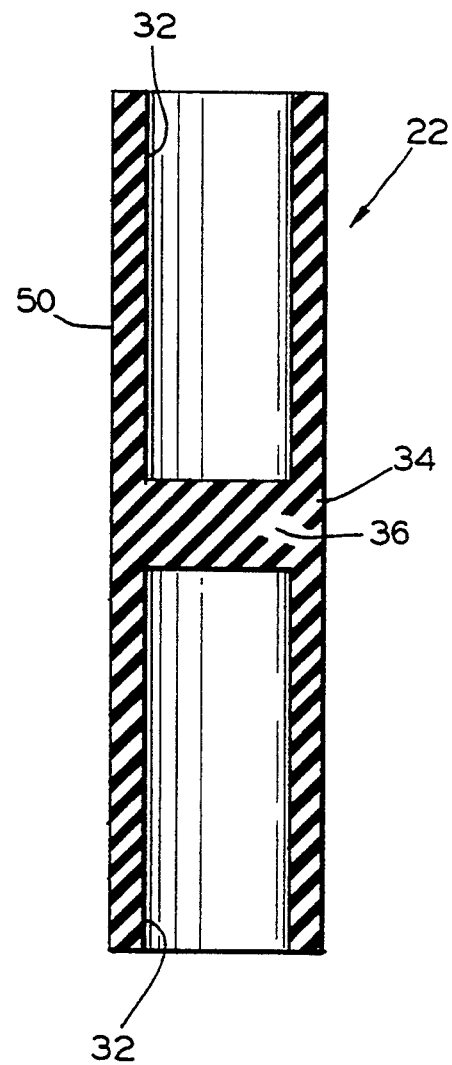
FIG. 2 is a cross sectional view of a cylindrical elastomeric sleeve which forms one part of the two-part damper assembly of FIG. 1.

Referring to FIGS. 1 and 2, a compound shift lever mechanism 10 includes an upper lever 12 and a lower lever 14 fixed together coaxially along a longitudinal axis "a—a". The levers 12 and 14 define respective male end portions 16 and 18 which are adapted to be resiliently secured together via a two-part lever damper assembly 20. For this purpose, the male end portion 16, which comprises the lower portion of the upper lever 12, and the male end portion 18, which comprises the upper end of the lower lever 14, are adapted to fit snugly in upper and lower sleeve bores 32 (FIG. 2) of the sleeve 22, which forms a first part of the damper 20.

The sleeve 22 includes a mid portion 34 which includes a radially extending elastomeric barrier 36. The barrier, preferably a disc integrally molded into the sleeve, is adapted to prevent direct physical contact between radially extending axial extremities 38 and 40 of the upper and lower male end portions 16 and 18, respectively.

An exterior cylindrical metallic shell 24 forms the second part of the damper assembly 20. The shell is a structural support member for frictionally securing the levers 12 and 14 together under compressive forces against the sleeve and, in turn, against both male end portions 16 and 18, for frictional retention of the levers in substantially fixed, spaced, coaxial alignment. Thus, an upper female end portion 26 of the shell 24 is crimped about the upper male end portion 16, while an axially spaced lower female end portion 28 of the shell 24 is crimped about the lower male end portion 18. A midportion 30 of the shell 24 remains uncrimped and has a larger diameter than the shell end portions 26 and 28. As such, the midportion 30 is able to accommodate elastomeric flow of the sleeve 22 upon crimping of the end portions 26 and 28. In the preferred embodiment disclosed, knurled surfaces 44 extend circumferentially about the male end portions 16 and 18 to enhance frictional engagement of the levers 12 and 14 within the bores 32 of the sleeve 22. Those skilled in the art will appreciate that the circumferential exterior surface 50 of the sleeve 22 will be compressed radially inwardly by the compressive forces imparted by the upper and lower crimped shell end portions 26 and 28.

The barrier 36 in the preferred form of the present invention is an integral disc effective to prevent direct physical contact between upper and lower levers 12 and 14. Although the disc is preferably molded as an integral part of the sleeve 22, the disc may optionally be a separate elastomeric part or member, installed within the sleeve during manufacture. As such however, it must function to maintain spacing between and to prevent contact between extremities 38 and 40 of the levers. In the finished assembly 10, the barrier 36 defines the axial spacing between the noted lever end extremities. In one preferred embodiment the barrier had an axial thickness of one-half inch in a sleeve 22 which was five inches in length. Alternatively, of course, an air gap may be employed in lieu of an actual physical barrier 36. Use of the physical barrier 36 will, however, always assure requisite axial spacing.

In the preferred form, the crimped upper female end portion 26 and lower female end portion 28 of the shell 24 define segments which each comprise approximately 20 to 35% of the overall axial length of the shell which in the as described preferred embodiment has a length equal to that of the shell 22. As depicted in FIG. 1, each segment ideally surrounds the one knurled surface 44 of each respective one of the male end portions. Thus both knurled portions of the levers are encapsulated.

In a preferred form, the sleeve 22 has a cross-section in the form of an "H", with upper and lower ends of the "H" defining the bores 32 while the cross-bar "midsection" 34 of the "H" defines the barrier 36. The levers 12 and 14 are assembled together by inserting upper and lower male end portions 16 and 18 into respective bores of the sleeve, and then installing the metallic shell 24 about the sleeve to circumferentially encapsulate the sleeve within the shell. The final step is to crimp the ends of the shell about the sleeve to form permanent radially inwardly directed compressive forces against the sleeve within the damper assembly. As noted, the midportion of the shell remains uncrimped, and hence provides a relief area for the elastomer of the sleeve to flow into upon crimping of the respective ends 26 and 28 of the shell.

Finally, in the preferred form, the extremities 60 of the metallic shell 24 are beveled angularly inwardly toward the axis "a—a" by an angle "A" (see FIG. 1). The angle "A" preferably ranges between 15 to 20 degrees. The inwardly turned extremities 60 will more readily accommodate a rubber or plastic cover or boot which may be optionally added to the shift lever mechanism 10. A radial clearance "B" between the extremities 60 and surfaces of levers 14,16 is preferably in a range of 50 to 75 thousandths of an inch to absolutely assure avoidance of metal-to-metal contact.

Although only one preferred embodiment has been detailed and described herein, the following claims are envisioned to cover numerous additional embodiments which fall within their spirit and scope.

What is claimed is:

1. In a compound shift lever mechanism including a pair of shift levers fixed together along a longitudinal axis, each of said levers defining an end portion positioned along said axis in an axially spaced, coaxial alignment with respect to the other, said mechanism further including a noise and vibration damper assembly adapted to resiliently hold said levers together in said spaced, coaxial alignment for substantially unitary movement of said levers in a plurality of planes; an improvement wherein said damper assembly comprises:
   (a) a cylindrical elastomeric sleeve, said sleeve directly overlying and circumferentially encapsulating each of said end portions of said levers, said sleeve having a midportion comprising means for spacing between, and prevention of direct physical contact between, radially extending axial extremities of said spaced end portions of said levers, and
   (b) an exterior cylindrical metallic shell directly overlying and circumferentially encapsulating said sleeve, said shell crimped against and radially inwardly compressing said sleeve against each of said end portions only to frictionally retain said shift levers in said spaced, coaxial alignment.

2. The damper assembly of claim 1 wherein said means for spacing between, and prevention of direct physical contact between, radially extending axial extremities of said spaced end portions of said levers comprises a radially extending elastomeric barrier situated within said midportion of said sleeve.

3. The damper assembly of claim 2 wherein said barrier defines an axial spacing between said radial extremities of said spaced end portions.

4. The damper assembly of claim 3 wherein said elastomeric barrier is molded into said sleeve and defines an integral part of said sleeve.

5. The damper assembly of claim 4 wherein said end portions of said levers comprise circumferentially extending knurled surfaces to enhance frictional retention of said levers in said sleeve.

6. The damper assembly of claim 5 wherein said shell further comprises spaced female end portions which define crimped segments of said shell and a shell midportion situated between said segments, wherein said segments directly engage the exterior circumferential surface of said sleeve, wherein each one of said segments surrounds one knurled surface of one of said end portions.

7. The damper assembly of claim 6 wherein said crimped segments each comprises approximately 20 to 35% of the axial length of said shell.

8. The damper assembly of claim 7 wherein said shell midportion comprises a larger diameter portion of said shell than either of said crimped segments.

9. The damper assembly of claim 8 wherein said female end portions of said shell define extremities which are beveled angularly inwardly toward said longitudinal axis.

10. A method of forming a damper assembly for a compound shift lever mechanism having a pair of levers coaxially fixed together in end-to-end relationship to define a longitudinal axis, comprising the step of
   (a) providing a cylindrical elastomeric sleeve containing a pair of coaxially aligned, axially spaced bores, and a midportion of said sleeve containing an internal radially extending barrier integral to the sleeve,
   (b) inserting one end of each lever into one of each of said bores,
   (c) installing a cylindrical metallic shell circumferentially about the exterior circumferential surface of said sleeve, such that said sleeve is radially encapsulated within said shell, and
   (d) radially crimping axially spaced end portions of said shell to form an uncrimped midportion therebetween, said midportion having a diameter greater than that of either of said crimped ends.

* * * * *